United States Patent
Li et al.

(10) Patent No.: US 10,527,124 B2
(45) Date of Patent: Jan. 7, 2020

(54) NON-LIMIT MULTI-FUNCTION VISCOELASTIC SUPPORT STRUCTURE GROUP

(71) Applicant: National University of Defense Technology, Changsha, Hunan (CN)

(72) Inventors: Dongxu Li, Hunan (CN); Changping Yin, Hunan (CN); Dong Hao, Hunan (CN); Wang Liu, Hunan (CN)

(73) Assignee: National University of Defense Technology, Changsha, Hunan Province (CN)

(*) Notice: Subject to any disclaimer, the term of this patent is extended or adjusted under 35 U.S.C. 154(b) by 0 days.

(21) Appl. No.: 15/989,200

(22) Filed: May 25, 2018

(65) Prior Publication Data

US 2019/0136941 A1 May 9, 2019

Related U.S. Application Data

(63) Continuation of application No. PCT/CN2017/119630, filed on Dec. 29, 2017.

(30) Foreign Application Priority Data

Nov. 1, 2016 (CN) .......................... 2016 1 0933481

(51) Int. Cl.
*F16F 15/08* (2006.01)
*B64D 27/26* (2006.01)

(52) U.S. Cl.
CPC .............. *F16F 15/08* (2013.01); *B64D 27/26* (2013.01); *F16F 2224/025* (2013.01)

(58) Field of Classification Search
CPC .......... F16F 1/3737; F16F 9/306; F16F 15/08; F16F 2224/025; B64D 27/26
See application file for complete search history.

(56) References Cited

U.S. PATENT DOCUMENTS

| | | | | |
|---|---|---|---|---|
| 6,420,475 B1 * | 7/2002 | Chen | ...................... | A61C 15/00 523/105 |
| 2010/0272673 A1 * | 10/2010 | Horstman | .............. | A61K 8/893 424/78.37 |

(Continued)

FOREIGN PATENT DOCUMENTS

| CN | 101408045 A | 4/2009 |
|---|---|---|
| CN | 101725482 A | 6/2010 |

(Continued)

*Primary Examiner* — Eret C McNichols

(57) ABSTRACT

A non-limit multi-function viscoelastic support structure group, relating to a field of aerospace structural design, includes a basic structure, a supported structure and multiple viscoelastic support structure units. The multiple viscoelastic support structure units form a circular discontinuous group and are arranged between the basic structure and the supported structure. The viscoelastic support structure units are connected with the basic structure and the supported structure respectively in ways of pre-pressing and surface contact, and no fixed constrained relationship exists. The present invention absorbs a vibration energy through a viscoelastic effect of own structural material and forms a spring-oscillator vibration attenuation system with the supported structure. With a geometric topology boundary change of the structure group, the supported structure is allowed to have a relative motion, thereby consuming the external vibration energy through converting into a kinetic energy of an oscillator, which effectively improves a mechanical environment of the supported structure.

6 Claims, 3 Drawing Sheets

(56) References Cited

U.S. PATENT DOCUMENTS

2018/0066723 A1* 3/2018 Inoue .................. F16F 15/03
2018/0216687 A1* 8/2018 Thompson ............ F16F 15/085
2018/0347658 A1* 12/2018 Shrinkle ................ F16F 15/04
2019/0185672 A1* 6/2019 Boland .................. C08L 83/04

FOREIGN PATENT DOCUMENTS

| CN | 105315515 A | 2/2016 |
| CN | 106499917 A | 3/2017 |
| JP | 20030239425 A | 8/2003 |
| JP | 20090127653 A | 6/2009 |

* cited by examiner

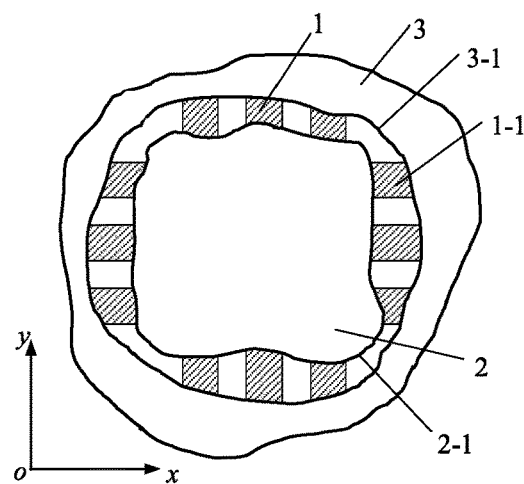
FIG. 1
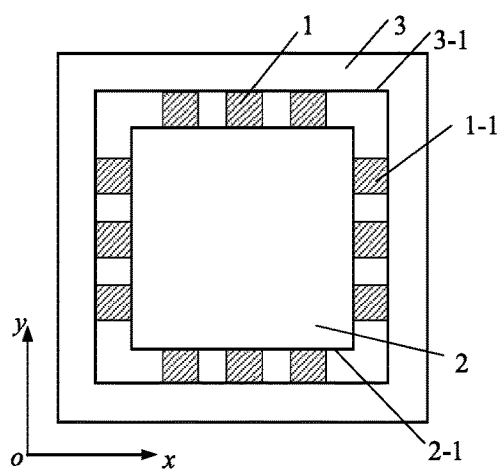
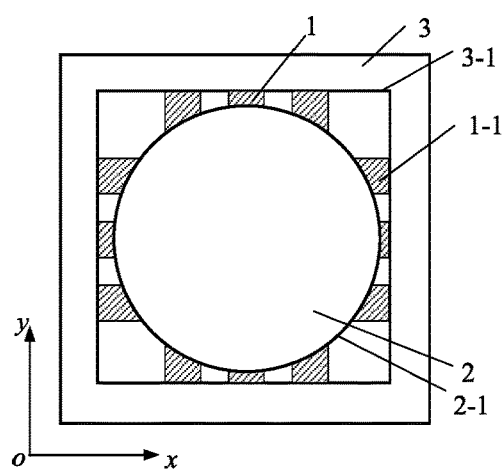
FIG. 2(a)  FIG. 2(b)
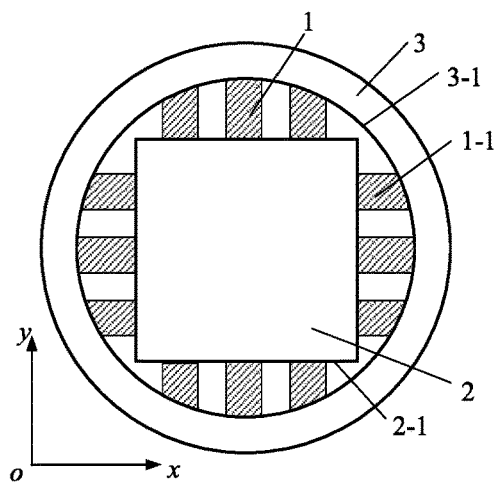
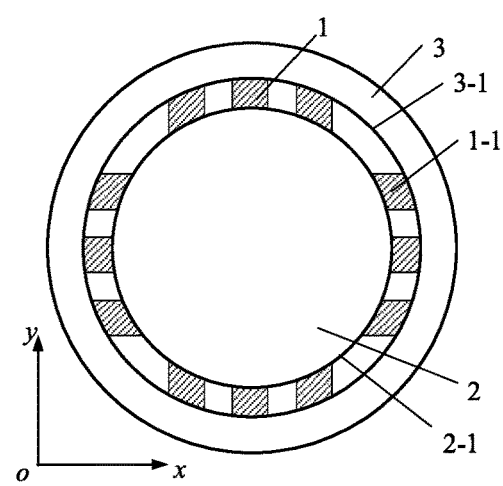
FIG. 2(c)  FIG. 2(d)

NON-LIMIT MULTI-FUNCTION VISCOELASTIC SUPPORT STRUCTURE GROUP

CROSS REFERENCE OF RELATED APPLICATION

The application is a continuation application of a PCT application No. PCT/CN2017/119630, filed on Dec. 29, 2017; and claims the priority of Chinese Patent Application No. CN201610933481.0, filed to the State Intellectual Property Office of China (SIPO) on Nov. 1, 2016, the entire content of which are incorporated hereby by reference.

BACKGROUND OF THE PRESENT INVENTION

Field of Invention

The present invention relates to a field of aerospace structural design, and more particularly to a non-limit multi-function viscoelastic support structure group.

Description of Related Arts

In prior art, there are mainly two ways to realize the connection between two objects or between two structures. The first way is to adopt the mechanical connection, such as screw connection, rivet connection, welding connection, plug/clamp connection, hinge connection, and pin connection. The second way is to adopt the chemical connection, such as adhesive connection (glue connection) and hot-melt connection. However, in some aerospace applications, it is not allowed to connect the special objects or structures (such as the new structure battery) with the conventional connection ways, such as screw connection or glue connection. Moreover, it is expected that: besides the conventional support and bearing functions, multiple other functions are integrated with the connecting structure. For example, the connected (or supported) structure is required to have a relative motion with keeping the connection state, so as to realize the object of vibration energy consumption, thereby improving the mechanical environment of the connected structure; and, while realizing the functions of support and connection, the connecting structure is required to effectively decrease the transmission of the external vibration in the structure.

Thus, it is urgent to develop a multi-function elastic support structure which not only is able to realize functions of support, bearing and force transmission and able to decrease the vibration transmission, but also meets the aerospace application requirements, which cannot be realized by the conventional connection way. The support structure has multiple functions; that is to say, besides the functions of support and bearing, the support structure is further able to consume the vibration energy through the own elastic deformation and able to provide stiffness and damping at the same time, and preferably has the good insulation property, heat dissipation capability and space environment adaptability, so as to meet the aerospace application requirements such as installation of the first-class charged and heating device.

SUMMARY OF THE PRESENT INVENTION

An object of the present invention is to provide a non-limit multi-function viscoelastic support structure group, so as to solve technical problems in prior art that a conventional support structure is difficult to adapt to a complex vacuum environment of outer space and difficult to support a first-class aerospace power source structure while realizing multiple functions of vibration attenuation, heat dissipation and insulation.

Detailed technical solutions are described as follows.

A non-limit multi-function viscoelastic support structure group comprises a basic structure, a supported structure and multiple viscoelastic support structure units, wherein: the multiple viscoelastic support structure units form a circular discontinuous group and are arranged between the basic structure and the supported structure; the viscoelastic support structure units are connected with the basic structure and the supported structure respectively in ways of pre-pressing and surface contact, and no fixed constrained relationship exists; the number and geometric dimension of the viscoelastic support structure units in the multi-function viscoelastic support structure group is comprehensively determined by stiffness and damping required to be provided by the supported structure, a geometric boundary condition between the supported structure and the basic structure, and an internal pre-pressing force of the viscoelastic support structure units.

Preferably, the viscoelastic support structure units are made of material which has an elasticity modulus not smaller than 2.0 MPa, a Poisson's ratio smaller than 0.47, an insulation resistance larger than 50 MΩ, a heat conductivity coefficient larger than 0.2 W/(m·K) and a vacuum volatility smaller than 0.01%.

Preferably, a dimension L of the viscoelastic support structure unit at a length direction is determined by an equation of:

$$L = \frac{E \cdot A}{E \cdot A - F_0} \cdot D; \quad (1)$$

wherein: E and A are respectively a compressive elasticity modulus and a cross sectional area of the viscoelastic support structure unit; $F_0$ represents a pre-pressing force of the viscoelastic support structure unit at an ideal installation condition; D is a vertical distance between the supported structure and the basic structure; and "·" represents a multiplication sign.

Preferably, a dimension H of the viscoelastic support structure unit at a thickness direction meets a following equation of:

$$H \leq H_0 - v(L-D) \quad (2);$$

wherein: v represents a Poisson's ratio of the material used in the viscoelastic support structure unit; and $H_0$ is a thickness of the supported structure.

Preferably, the number n of the viscoelastic support structure units arranged at a horizontal direction (x-direction) and a vertical direction (y-direction) should respectively meet a following equation of:

$$n \geq K_0 \cdot \frac{L}{E \cdot A}; \quad (4)$$

wherein: E, L and A are respectively the compressive elasticity modulus, length and cross sectional area of the viscoelastic support structure unit; and $K_0$ is a stiffness required to be provided by the supported structure.

Preferably, an outer envelope curve of the supported structure is square or circular; an inner envelope curve of the basic structure is square or circular; two surfaces of the viscoelastic support structure group respectively contact an outer side of the supported structure and an inner side of the basic structure in the way of surface contact; and, a shape of the viscoelastic support structure group is determined by the outer envelope curve of the supported structure and the inner envelope curve of the basic structure together.

Preferably, the viscoelastic support structure units are made of vinyl-terminated polydimethylsiloxane.

Preferably, the non-limit multi-function viscoelastic support structure group is applicable in aerospace structure; and the supported structure is a power supply module.

The present invention has following technical effects. According to the present invention, a good steady support is provided for the supported structure. On one hand, the present invention is able to absorb the vibration energy through the viscoelastic effect of the own structural material. On the other hand, the present invention forms a spring-oscillator vibration attenuation system with the supported structure (equivalent to an oscillator having a certain mass). With the change of the geometric topology boundary of the structure group, the supported structure is allowed to have a relative motion, thereby consuming the vibration energy in the way of converting the external vibration energy into the kinetic energy of the oscillator. The comprehensive effect of above two aspects decreases the transmission of the vibration in the structure and effectively improves the mechanical environment of the supported structure. Thus, the present invention provides a new structure support way with flexible design and good configuration and performance retention abilities, which not only is able to realize functions of support, bearing and force transmission and able to decrease the vibration transmission, but also has good performances such as the good insulation property and heat dissipation capability, a greatly small vacuum volatility, a spatial high-low temperature resistance and a good cycle performance, so that the present invention well meets the requirements of the aerospace application and development. The present invention effectively solves the difficult design problem of integration of multiple functions of structural non-limit restrained support, vibration attenuation, insulation, and heat dissipation.

BRIEF DESCRIPTION OF THE DRAWINGS

FIG. 1 is a sketch view of a non-limit multi-function viscoelastic support structure group according to a preferred embodiment of the present invention.

FIG. 2(a) shows a connection condition of the multi-function viscoelastic support structure group when being applied in a square supported structure and a square basic structure according to the preferred embodiment of the present invention.

FIG. 2(b) shows a connection condition of the multi-function viscoelastic support structure group when being applied in a circular supported structure and a square basic structure according to the preferred embodiment of the present invention.

FIG. 2(c) shows a connection condition of the multi-function viscoelastic support structure group when being applied in a square supported structure and a circular basic structure according to the preferred embodiment of the present invention.

FIG. 2(d) shows a connection condition of the multi-function viscoelastic support structure group when being applied in a circular supported structure and a circular basic structure according to the preferred embodiment of the present invention.

In figures: 1: multi-function viscoelastic support structure group; 1-1: viscoelastic support structure unit; 2: supported structure; 2-1: outer envelope curve of the supported structure; 3: basic structure; 3-1: inner envelope curve of the basic structure, namely a constrained boundary; L represents a length of one viscoelastic support structure unit; W represents a width of one viscoelastic support structure unit; H represents a thickness of one viscoelastic support structure unit; and xoy represents a coordinate system.

DETAILED DESCRIPTION OF THE PREFERRED EMBODIMENT

The present invention is further illustrated with the accompanying drawings and the preferred embodiment.

As shown in FIG. 1, according to the present invention, a non-limit multi-function viscoelastic support structure group comprises multiple viscoelastic support structure units, wherein: the multiple viscoelastic support structure units 1-1 are circularly and discontinuously arranged between a supported structure 2 and a basic structure 3, for providing a steady support for the supported structure 2. The non-limit multi-function viscoelastic support structure group can be applied in a combination of the supported structure of arbitrary shape (that is to say a shape of an outer envelope curve of the supported structure is arbitrary) with the basic structure of arbitrary shape (that is to say a shape of an inner envelope curve of the basic structure is arbitrary). FIG. 1 shows a sketch view of a general application of the present invention. In order to better show applications of the present invention, other four common applications of the present invention are respectively showed in FIG. 2(a), FIG. 2(b), FIG. 2(c) and FIG. 2(d). FIG. 2(a) shows an application of the multi-function viscoelastic support structure group provided by the present invention in supporting a power supply module for aerospace; the power supply module as the supported structure is a first-class charged and heating aerospace structure; besides the function of effectively supporting the supported structure, it is also expected to realize functions of vibration attenuation, insulation and heat dissipation to the supported structure at the same time. The present invention is further described in detail with a condition shown in FIG. 2(a) as follows.

Figure 3:
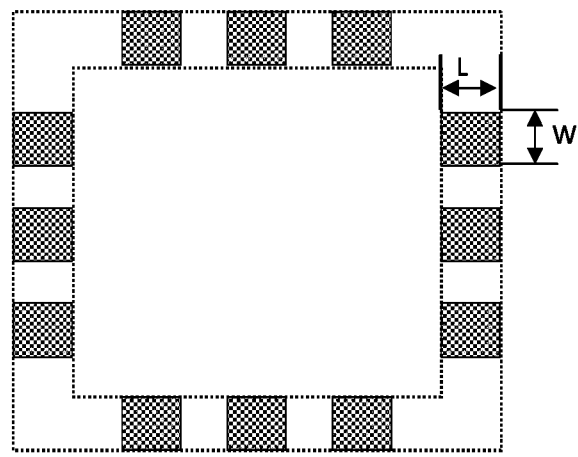
FIG. 3 is a composition sketch view of the multi-function viscoelastic support structure group at the connection condition shown in FIG. 2(a) according to the preferred embodiment of the present invention.
Figure 4:
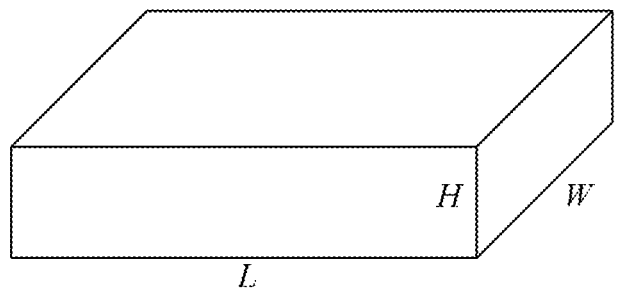
FIG. 4 is a dimension sketch view of one viscoelastic support structure unit in the multi-function viscoelastic support structure group at the connection condition shown in FIG. 2(a) according to the preferred embodiment of the present invention.

FIG. 2(a) shows a connection condition that the present invention is applied in a square supported structure and a square basic structure, wherein: the square supported structure means the outer envelope curve of the supported structure is square; the square basic structure means the inner envelope curve of the basic structure is square; the outer envelope curve 2-1 of the supported structure and the inner envelope curve of the basic structure 3, namely a constrained boundary 3-1, together determine a geometric topology configuration of the multi-function viscoelastic support structure group provided by the present invention. Obviously, according to the preferred embodiment, the geometric topology configuration of the multi-function viscoelastic support structure group 1 is a hollow square, as shown in FIG. 3; the designed viscoelastic support structure units 1-1 are cubic, and a sketch view of shape and dimension thereof is showed in FIG. 4.

It can be also seen from FIG. 2(*a*) that: the viscoelastic support structure units 1-1 are connected with the supported structure 2 and the basic structure 3 both in a way of surface contact, and no geometric limit relationship exists; the viscoelastic support structure units 1-1 are arranged between the supported structure 2 and the basic structure in a way of pre-pressing, and elastic restraint and support for the supported structure 2 is realized through enough elastic pressure and surface friction force generated by pre-pressing. With the above way of generating the elastic force and the friction force through pre-pressing, the elastic restraint and support for the supported structure 2 is realized, so that a good steady support is provided for the supported structure 2. The viscoelastic support structure units 1-1 not only are able to realize functions of support, bearing and force transmission and play an elastic support effect, but also have a vibration attenuation effect on the supported structure through consuming vibration energy by own elastic deformation. Through a viscoelastic effect generated by the viscoelastic support structure units 1-1, the multi-function viscoelastic support structure group 1 is able to attenuate the vibration energy of a structural system.

Figure 5:
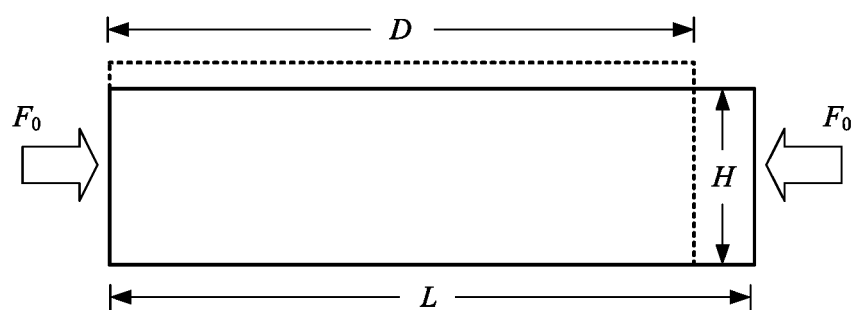
FIG. 5 is a deformation sketch view of the viscoelastic support structure unit under an effect of a pre-pressing force according to the preferred embodiment of the present invention.

In order to generate an appropriate pre-pressing force inside the viscoelastic support structure unit 1-1, an appropriate dimension L of the viscoelastic support structure unit 1-1 at a length direction is required. A pre-pressing force of the viscoelastic support structure unit at an ideal installation condition is assumed to be $F_0$, and a vertical distance (gap) between the supported structure 2 and the basic structure 3 is D. Because the length L of the viscoelastic support structure unit will shorten under an effect of the pre-pressing force $F_0$ (a sketch view of deformation thereof is showed in FIG. 5), a shortening amount is $F_0L/EA$, a length of the viscoelastic support structure unit after shortening is equal to the gap D, and therefore $L-F_0L/EA=D$. Thus, L meets a following equation of:

$$L = \frac{E \cdot A}{E \cdot A - F_0} \cdot D. \quad (1)$$

Moreover, the dimension H of the viscoelastic support structure unit 1-1 at a thickness direction should be consistent with the thickness $H_0$ of the supported structure as far as possible, but smaller than $H_0$. Because the viscoelastic support structure unit 1-1 is embedded between the supported structure 2 and the basic structure 3 in the way of pre-pressing, according to a Poisson effect of material, while the length L of the viscoelastic support structure unit 1-1 is shortened, the dimension H of the viscoelastic support structure unit at the thickness direction will increase, and an increasing amount is $v(L-D)$. The Poisson's ratio of the material used in the viscoelastic support structure unit 1-1 is assumed to be v, and the dimension H is required to meet a following equation of:

$$H \leq H_0 - v(L-D) \quad (2).$$

The number n of the viscoelastic support structure units required to be arranged at an arbitrary direction (the horizontal direction, i.e. x-direction, or the vertical direction, i.e. y-direction) is further discussed as follows. Here taking the situation of x-direction (shown in FIG. 2(*a*)) as an example. For the viscoelastic support structure units, the compressive elasticity modulus is assumed to be E; the length is L; the width is W; the thickness is H; and the cross sectional area is A, A=W·H. The stiffness required to be provided by the supported structure at this direction is supposed to be $K_0$. Hence, the stiffness that can be provided by the viscoelastic support structure units at the x-direction (denoted as $K_1$) is equivalent to a stiffness of combining n springs together, which can be expressed by an equation of:

$$K_1 = n\frac{E \cdot A}{L} = n\frac{E \cdot W \cdot H}{L} \geq K_0. \quad (3)$$

Furthermore, it can be deduced that the number n should meet a following equation of:

$$n \geq K_0 \cdot \frac{L}{E \cdot A}. \quad (4)$$

Through synthesizing the equations (1), (2) and (4), a conclusion can be obtained that: the number and geometric dimension of the viscoelastic support structure units 1-1 are mainly comprehensively determined by the stiffness and damping required to be provided by the supported structure 2, a geometric boundary condition between the supported structure 2 and the basic structure 3, and the pre-pressing force $F_0$ inside the structure.

According to the preferred embodiment shown in FIG. 2(*a*), the gap D between the supported structure 2 and the basic structure 3 is assumed to be D=38 mm; the ideal pre-pressing force $F_0$=100 N; the compressive elasticity module E=2.0 MPa; the cross sectional area A=800 mm$^2$; according to the equation (1), it is calculated that the length L of the viscoelastic support structure units is 40.53 mm. Moreover, the stiffness required to be provided by the supported structure is assumed to be $K_0$=1×10$^5$ N/m; according to the equation (4), it can be known that three viscoelastic support structure units are required at every direction, so as to support the power supply module.

In summary, the design method for the multi-function viscoelastic support structure group comprises three steps of:

(1), designing the geometric dimensions of the basic structure and the supported structure;

(2), designing the shape of the viscoelastic support structure unit, further comprising steps of: according to the inner envelope curve of the basic structure, determining the shape of the contact surface of the viscoelastic support structure unit at one end that is in contact with the basic structure; according to the outer envelope curve of the supported structure, determining the shape of the contact surface of the viscoelastic support structure unit at another end that is in contact with the supported structure; wherein:

the dimension L of the viscoelastic support structure unit at the length direction is determined through the equation of $$L = \frac{E \cdot A}{E \cdot A - F_0} \cdot D;$$

the dimension H of the viscoelastic support structure unit at the thickness direction meets the equation of $H \leq H_0 - v(L-D)$;

(3), designing the number of the viscoelastic support structure units; wherein: according to stiffness and damping required to be provided by the supported structure, the number n of the viscoelastic support structure units arranged at one direction should meet the equation of $$n \geq K_0 \cdot \frac{L}{E \cdot A},$$

wherein $K_0$ is the stiffness required to be provided by the supported structure at the direction.

Moreover, according to the preferred embodiment, the supported structure is a first-class charged and heating aerospace structure. In order to meet aerospace application requirements, the supported structure is required to have good performances such as good insulation property and heat dissipation capability, and meanwhile have volatility as small as possible at a vacuum environment. Thus, it is required that the viscoelastic support structure units 1-1 are made of material having a relatively high elasticity modulus, an appropriate Poisson' ratio, a large insulation resistance, a relatively high heat conductivity coefficient and a greatly small vacuum volatility; wherein: the elasticity modulus should be not smaller than 2.0 MPa, the Poisson's ratio should be smaller than 0.47; the insulation resistance should be larger than 50 MΩ; the heat conductivity coefficient should be larger than 0.2 W/(m·K); and the vacuum volatility should be smaller than 0.01%. According to the preferred embodiment, as shown in FIG. 1, the viscoelastic support structure units are made of vinyl-terminated polydimethylsiloxane, and a detailed preparation method thereof can refer to the Chinese patent application of CN 201610303550.X, Preparation method of multi-function elastic connection member.

The vinyl-terminated polydimethylsiloxane is an elastic high-molecular silicon rubber material, which has a strong machinability and can be produced into any shape according to specific application requirements through a mold injection method. The detailed chemical formula of the vinyl-terminated polydimethylsiloxane is:

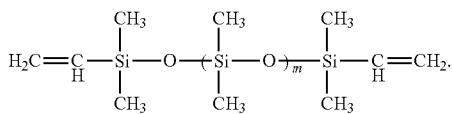

Because of adopting the above elastic high-molecular silicon rubber material, the produced viscoelastic support structure units have a relatively small elasticity modulus of about 2.0 MPa and thus have a good elastic property. Moreover, the material has the good insulation property and heat dissipation capability. The viscoelastic support structure units have an insulation resistance larger than 100 MΩ, a high electric strength and a strong pressure resistance, and thus the electric insulation property thereof is excellent. Compared with conventional high-molecular materials, the vinyl-terminated polydimethylsiloxane has a relatively high heat conductivity coefficient of 0.326 W/(m·K) and a relatively good heat conductivity effect, and thus has a relatively good heat dissipation capability for the supported structure. Moreover, the vinyl-terminated polydimethylsiloxane has a greatly small vacuum volatility that the volatile matter can be collected is smaller than 0.01% and thus is suitable for being applied in the space vacuum environment.

Figure 6:
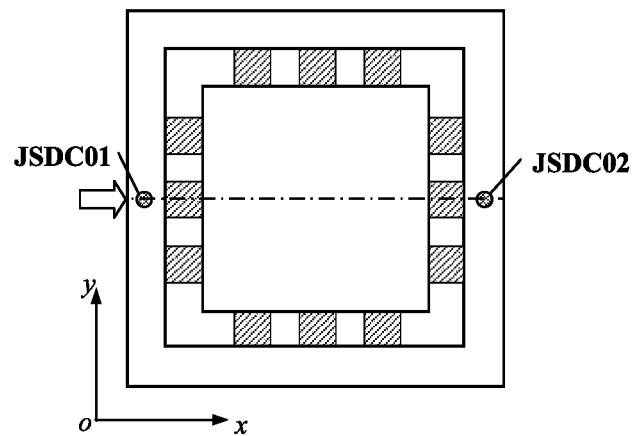
FIG. 6 is a sketch view of installation positions of two acceleration sensors according to the preferred embodiment of the present invention.
Figure 7:
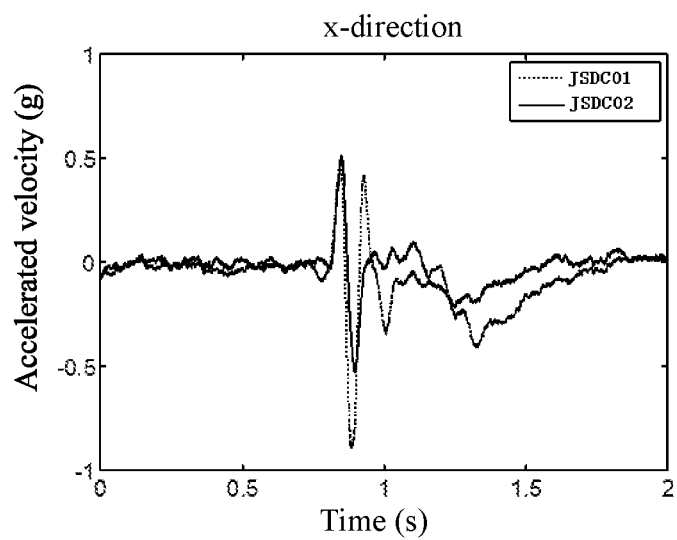
FIG. 7 is a diagram showing acceleration output responses at an x-direction according to the preferred embodiment of the present invention.

In order to verify the vibration attenuation effect of the present invention, an acceleration response test experiment is made for the structure shown in FIG. 2(a) at a ground condition. As shown in FIG. 6, along an x-direction, two acceleration sensors of JSDC01 and JSDC02 are respectively pasted and arranged at two midpoints of the frame, the frame is hard hammered along an arrow position and direction shown in FIG. 6 for knock excitation; and through testing, response signals of the acceleration sensors are collected by the computer. The obtained acceleration signals of the first acceleration sensor (JSDC01) and the second acceleration sensor (JSDC02) when knocking along the x-direction are showed in FIG. 7. It can be seen from FIG. 7 that: a signal peak value of the first acceleration sensor is obviously larger than that of the second acceleration sensor. Thus, it can be concluded that: the vibration generated by knocking is obviously attenuated after transmitting through the structure provided by the present invention.

One skilled in the art will understand that: the scope of the present invention is not limited to the above preferred embodiment; and, various changes and modifications can be made without departing from the scope of the present invention limited by the claims. Although the present invention is described in detail with the drawings and the specification, the illustration and the description are exemplary only and merely for illustrating, not for limiting the present invention. The present invention is not limited the disclosed preferred embodiment.

Through the research of the drawings, specification and claims, when implementing the present invention, one skilled in the art can understand and realize the variation of the disclosed preferred embodiment. In the claims, the term of "comprise" does not exclude other steps or elements; the indefinite article of "one" or "one kind" does not exclude multiple objects. The fact that some measures are cited in the different dependent claims does not mean the combination of the measures cannot be effectively used. Any reference character in the claims does not limit the scope of the present invention.

What is claimed is:

1. A design method for a non-limit multi-function viscoelastic support structure group, comprising steps of:

(1), providing the non-limit multi-function viscoelastic support structure group comprising a basic structure, a supported structure and multiple viscoelastic support structure units; wherein: the multiple viscoelastic support structure units are placed between the basic structure and the supported structure in a pre-compression way; a type of contact between the viscoelastic support structure units and the basic structure is surface contact and, a type of contact between the viscoelastic support structure units and the supported structure is also surface contact;

(2), designing geometric dimensions of the basic structure and the supported structure;

(3), designing a shape of each viscoelastic support structure unit, further comprising steps of: according to an inner envelope curve of the basic structure, determining a shape of a contact surface of the viscoelastic support structure unit at one end that is in contact with the basic structure; according to an outer envelope curve of the supported structure, determining a shape of a contact surface of the viscoelastic support structure unit at another end that is in contact with the supported structure; wherein:

a dimension L of the viscoelastic support structure unit at a length direction is determined through a following equation of:

$$L = \frac{E \cdot A}{E \cdot A - F_0} \cdot D; \tag{1}$$

wherein: E and A are respectively a compressive elasticity modulus and a cross sectional area of the viscoelastic support structure unit; $F_0$ represents a pre-pressing force of the viscoelastic support structure unit at an ideal installation condition; and D is a vertical distance between the supported structure and the basic structure;

a dimension H of the viscoelastic support structure unit at a thickness direction meets a following equation of:

$$H \leq H_0 - v(L-D) \tag{2};$$

wherein: v represents a Poisson's ratio of material used in the viscoelastic support structure unit; and $H_0$ is a thickness of the supported structure;

(4), designing the number of the viscoelastic support structure units; wherein: according to stiffness and damping required to be provided by the supported structure, the number n of the viscoelastic support structure units arranged at one direction should meet a following equation of:

$$n \geq K_0 \cdot \frac{L}{E \cdot A}; \tag{4}$$

wherein: E, L and A are respectively the compressive elasticity modulus, length and cross sectional area of the viscoelastic support structure unit; and $K_0$ is the stiffness required to be provided by the supported structure at the direction.

2. The design method for the non-limit multi-function viscoelastic support structure group, as recited in claim 1, wherein: the multiple viscoelastic support structure units form a circular discontinuous group.

3. The design method for the non-limit multi-function viscoelastic support structure group, as recited in claim 1, wherein: the viscoelastic support structure units are made of material which has an elasticity modulus not smaller than 2.0 MPa, a Poisson's ratio smaller than 0.47, an insulation resistance larger than 50 MΩ, a heat conductivity coefficient larger than 0.2 W/(m·K) and a vacuum volatility smaller than 0.01%.

4. The design method for the non-limit multi-function viscoelastic support structure group, as recited in claim 1, wherein: the outer envelope curve of the supported structure is square or circular; the inner envelope curve of the basic structure is square or circular; and, a shape of the viscoelastic support structure group is determined by the outer envelope curve of the supported structure and the inner envelope curve of the basic structure together.

5. The design method for the non-limit multi-function viscoelastic support structure group, as recited in claim 1, wherein: the viscoelastic support structure units are made of vinyl-terminated polydimethylsiloxane.

6. The design method for the non-limit multi-function viscoelastic support structure group, as recited in claim 1, wherein: the non-limit multi-function viscoelastic support structure group is applicable in aerospace structure; and the supported structure is a power supply module.

* * * * *